(12) United States Patent
Gasparini et al.

(10) Patent No.: US 7,966,492 B1
(45) Date of Patent: Jun. 21, 2011

(54) SYSTEM AND METHOD FOR ALLOWING AN E-MAIL MESSAGE RECIPIENT TO AUTHENTICATE THE MESSAGE

(75) Inventors: Louis A. Gasparini, San Mateo, CA (US); William H. Harris, Woodside, CA (US)

(73) Assignee: EMC Corporation, Hopkinton, MA (US)

( * ) Notice: Subject to any disclaimer, the term of this patent is extended or adjusted under 35 U.S.C. 154(b) by 252 days.

(21) Appl. No.: 11/701,309

(22) Filed: Jan. 31, 2007

Related U.S. Application Data

(63) Continuation-in-part of application No. 11/511,998, filed on Aug. 28, 2006, now Pat. No. 7,346,775, and a continuation of application No. 10/435,322, filed on May 9, 2003, now Pat. No. 7,100,049, application No. 11/701,309, and a continuation-in-part of application No. 11/050,549, filed on Feb. 3, 2005.

(60) Provisional application No. 60/764,188, filed on Jan. 31, 2006, provisional application No. 60/379,295, filed on May 10, 2002, provisional application No. 60/542,101, filed on Feb. 4, 2004.

(51) Int. Cl.
*H04L 9/32* (2006.01)

(52) U.S. Cl. ......... 713/170; 713/151; 713/152; 713/168

(58) Field of Classification Search .................. None
See application file for complete search history.

(56) References Cited

U.S. PATENT DOCUMENTS

| | | | |
|---|---|---|---|
| 6,161,139 A | 12/2000 | Win et al. | |
| 7,167,914 B2 * | 1/2007 | Cohen et al. | 709/223 |
| 7,240,199 B2 * | 7/2007 | Tomkow | 713/168 |
| 7,325,127 B2 * | 1/2008 | Olkin et al. | 713/152 |
| 2002/0066039 A1 | 5/2002 | Dent | |
| 2006/0129602 A1 * | 6/2006 | Witriol et al. | 707/104.1 |

FOREIGN PATENT DOCUMENTS

| | | |
|---|---|---|
| EP | 1046976 | 10/2000 |
| EP | 04760929 | 4/2007 |
| WO | 0118636 | 3/2001 |
| WO | 0163878 | 8/2001 |
| WO | 03048909 | 6/2003 |

OTHER PUBLICATIONS

S, Loftesness, "Responding to "Phishing" Attacks-A Glenbrook Action Map," Glenbrook Partners LLC., Jan. 2004, pp. 1-12.

* cited by examiner

*Primary Examiner* — Kaveh Abrishamkar
(74) *Attorney, Agent, or Firm* — Ryan, Mason & Lewis, LLP

(57) ABSTRACT

A system and method allows a recipient to authenticate an e-mail message to ensure that the message came from its purported source and was not altered or was highly unlikely to be altered.

31 Claims, 6 Drawing Sheets

SYSTEM AND METHOD FOR ALLOWING AN E-MAIL MESSAGE RECIPIENT TO AUTHENTICATE THE MESSAGE

RELATED APPLICATIONS

This application claims the benefit of U.S. provisional patent application Ser. No. 60/764,188, entitled "System and Method for Allowing an E-Mail Message Recipient to Authenticate the Message" filed on Jan. 31, 2006 by William Harris and Louie Gasparini, and is a continuation in part U.S. application Ser. No. 11/511,998, entitled, "System and Method for Authentication of Users and Web Sites" filed on Aug. 28, 2006 now U.S. Pat. No. 7,346,775 by Louie Gasparini and Charles Gotlieb, which is a continuation of U.S. application Ser. No. 10/435,322, entitled, "Method and Apparatus for Authentication of Users and Web Sites," filed on May 9, 2003 by Louis Gasparini and Charles Gotlieb, U.S. Pat. No. 7,100,049, which claims the benefit of U.S. application serial number provisional patent application 60/379,295 entitled "Smart Marks" filed on May 10, 2002 by Louis Gasparini, and this application is also a continuation-in-part of U.S. application Ser. No. 11/050,549, entitled, "System and Method for Authentication of Users and Communications Received from Computer Systems," filed on Feb. 3, 2005 by Louis Gasparini and William Harris, which claims the benefit of U.S. Provisional Application Ser. No. 60/542,101 entitled, "Method and Apparatus for Authentication of Users and Communications Received From Computer Systems" filed on Feb. 4, 2004 by Louis Gasparini and William Harris, all having the same assignee as the present application, and each is hereby incorporated by reference in its entirety.

FIELD OF THE INVENTION

The present invention is related to computer software and more specifically to e-mail processing software.

BACKGROUND OF THE INVENTION

Conventional e-mail systems may be used to send messages. One problem with e-mail messages is that the source of the e-mail can be falsified to make it appear as though an entity other than the actual sender sent the message. For example, a malicious sender of an e-mail message could make the message appear as though it was sent from a financial institution.

When a sender falsifies the sender information in an e-mail message, the recipient of that message may take action or accept information contained in the message as true. For example, the e-mail message may indicate that the recipient's account at a financial institution requires updating, and the message may request the recipient to click on a link. When the recipient believes the message and clicks on the link, the recipient can be brought to a web site that looks like the web site of the financial institution, but is actually operated by the malicious party. When the recipient attempts to log into the web site, the user identifier and password are captured by the web site operated by the malicious party, and used by the malicious party to log into the real web site of the financial institution. The malicious part then takes the funds in the account of the recipient of the e-mail message.

A malicious party need not originate the message. The malicious party may simply intercept a legitimate message and change it. For example, the links in an e-mail message may be altered to correspond to a malicious party's server instead of the intended server. If the recipient clicks a link in the message, the recipient then communicates with the malicious party's server instead of the one intended by the sender of the message. The malicious party can then accomplish a malicious result, such as the one described above. However, if the recipient checks with the source of the message, for example, by phoning the financial institution that sent the original, unaltered message, the sender of the message may verify that in fact, they sent the message, authenticating the altered message.

If the recipient of such messages is aware of the potential problem with e-mail messages, the recipient may refuse to believe that any message from a financial institution is authentic. As a result, authentic messages from financial institutions are disbelieved or disregarded. Because e-mail is a relatively inexpensive advertising medium, financial institutions and others whose identity is frequently falsified in malicious e-mail messages are either forced to stop communicating with actual or potential customers via e-mail, continue to send e-mails that have a much lower rate of being read by the recipient than could otherwise be achieved, or must use a different communication medium that is more expensive than e-mail.

If the recipient could easily distinguish between a legitimate e-mail message and one from a malicious party, the above problems would not be prevalent. One potential way to allow a recipient to authenticate the message might be to store every e-mail message on the server of authentic senders of such messages. The recipient could then compare the message received with the messages stored for that recipient on the server, or automated tools could perform such comparison. However, such storage could involve millions of messages, and thus be prohibitively expensive.

Other ways of authenticating the message could be used, such as by encrypting the message with a private key and having the recipient decrypt the message with the purported sender's private key. However, such arrangements have proven to be too complex for many recipients to perform accurately.

What is needed is a system and method that can allow a recipient to authenticate an e-mail message without storing every e-mail message at the time the e-mail is sent and without requiring the recipient to employ a public key.

SUMMARY OF INVENTION

A system and method hashes (i.e. transforms) some or all of an e-mail message using any conventional hash technique, optionally encrypts the hash result as well as other information, and sends the encrypted hash result and other information with the message. After the recipient receives the message, the recipient can provide the message to a server of the purported sender. The server will decrypt the encrypted hash result in the message if such encryption had been performed, then re-hash some or all of the message in the same manner as was originally used to produce the hash result that was encrypted into the message. The newly-created hash result is compared with the one decrypted from the message, and if they match, the recipient is informed that the message was authentic, and otherwise, the recipient is informed that the message is not authentic.

Because the server itself could be operated by the same malicious party that sent the malicious message, the recipient can optionally authenticate the server, for example using techniques described in the related applications, or by communicating with the sender without using any links or buttons contained in the message.

There are many ways of accomplishing the providing of the message to, and optional authentication of, the server. The recipient may request a location to which the message can be returned and send the message to the destination (e.g. an e-mail address) received in response to the request, or the recipient can reply to the sender of the message, or to the sender and any or all other recipients of the message. The recipient can copy and paste some or all of the message, including the encrypted hash result, to a server, or the message itself can contain a mechanism for doing so, such as by posting the message contents, including the encrypted hash result, such as automatically, or via a submit button or a JavaScript program in an HTML message, or by posting some or all of the message, including the encrypted hash result by clicking on a link in an HTML or non-HTML message.

The recipient can then receive an indication as to whether the message is authentic, via any of a number of communications media, such as by phone, e-mail or by logging into a server. When the recipient logs into a server, the recipient can optionally use the techniques described in the related applications to authenticate the server. That technique involves receiving customization information previously agreed upon by the recipient and the server to allow the recipient to authenticate the server.

The server may retrieve an encrypted cookie from the recipient's computer system to identify the recipient, the recipient can provide an identifier of the recipient to the server to allow the server to authenticate the recipient, or both of these things may be used by the server to authenticate the recipient.

DETAILED DESCRIPTION OF A PREFERRED EMBODIMENT

Figure 1:
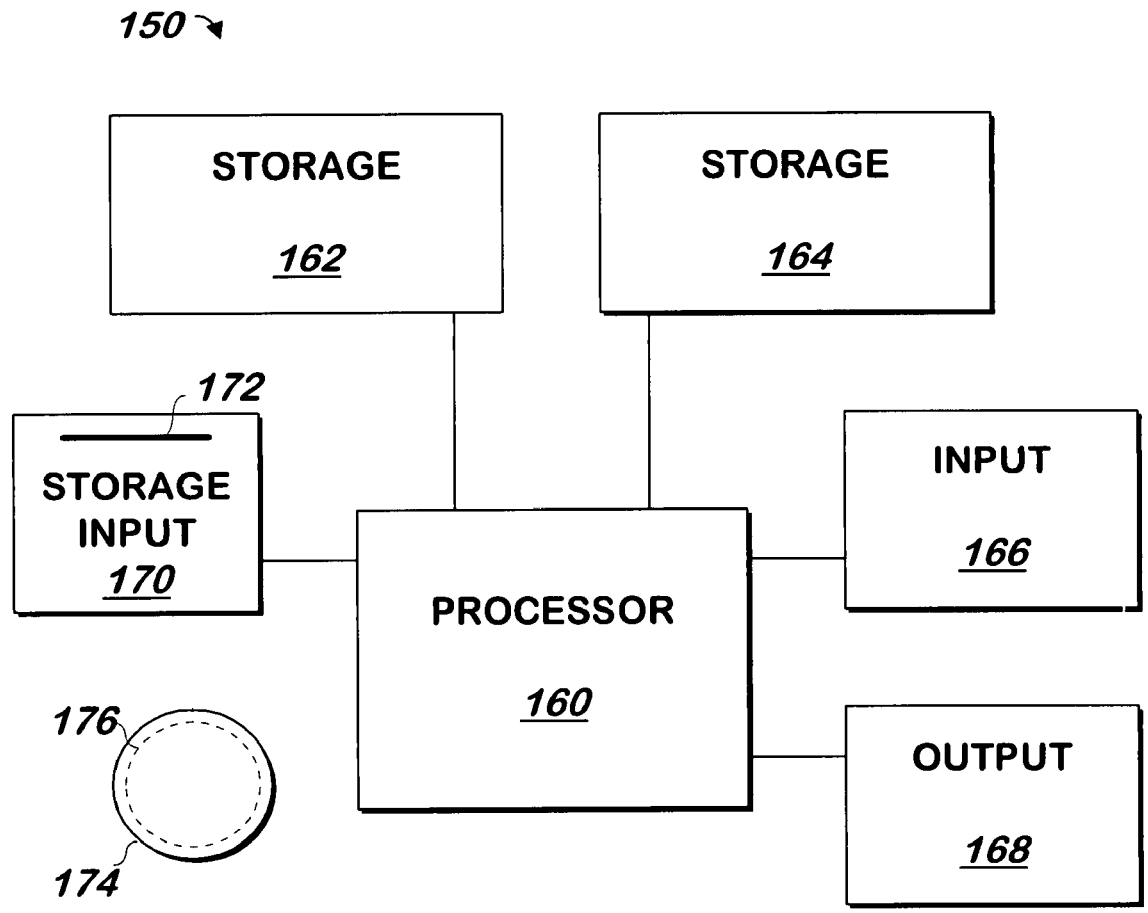
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE, INC. of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2:
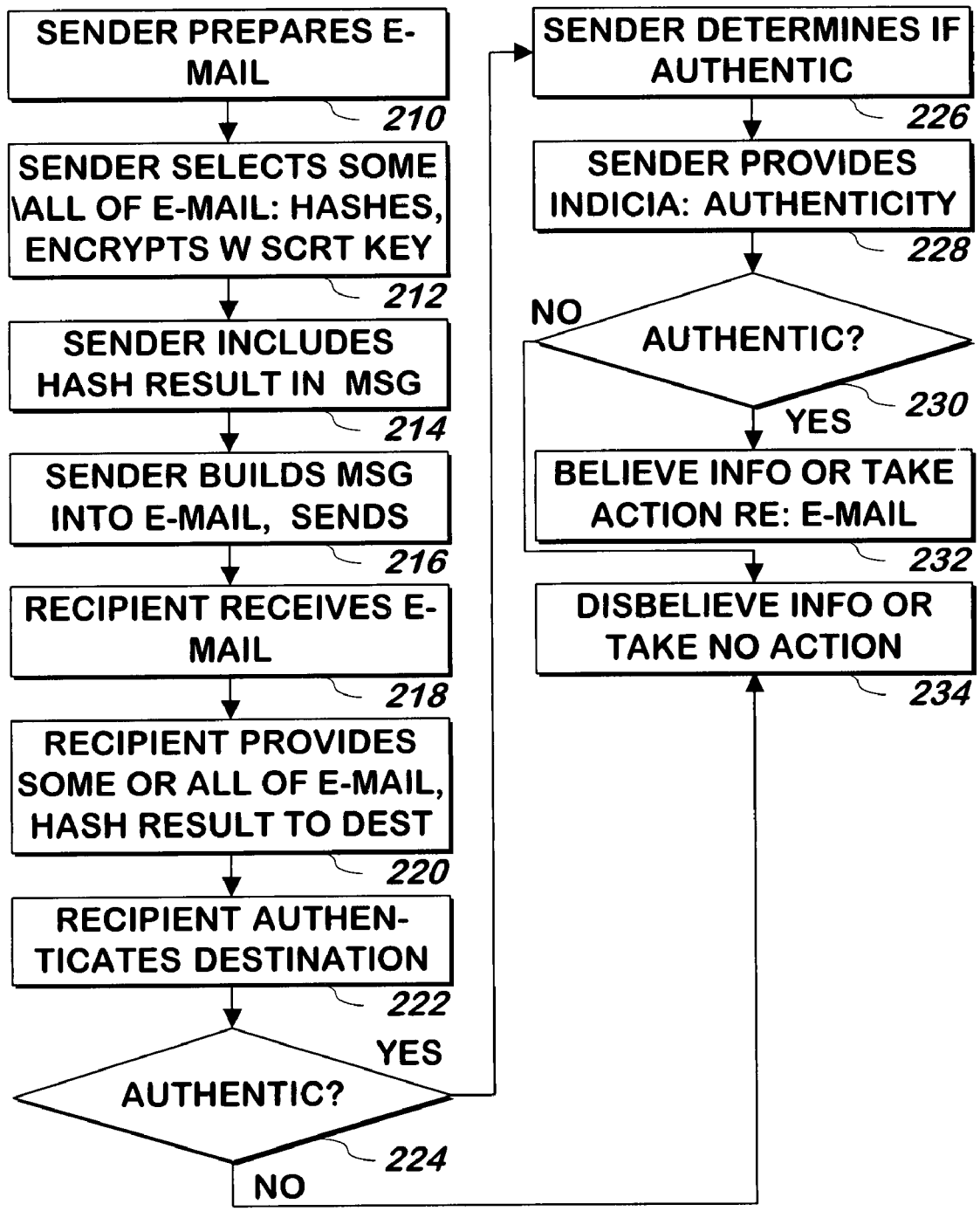
FIG. 2 is a flowchart illustrating a method of building an e-mail message for authentication and authenticating such an e-mail message according to one embodiment of the present invention.

FIG. 2 is a flowchart illustrating a method of authenticating the originator and verifying the contents of an electronic message, according to one embodiment of the present invention. Referring now to FIG. 2, a message that can be used to build an e-mail message (e.g. body text, which may include a date and time and other portions that are conventionally associated with a signature block, to and from fields, subject or header field) is prepared by a sender 210. The sender signs the message by hashing of some or all of the body text of the message, including addresses, using a one-way mathematical hash function to produce a hash result 212. Any hash function or other type of transformation may be used, though functions that are likely to produce a different result for any change may be used. In one embodiment, some or all of the body text of the message is hashed. In other embodiments, any or all of the addresses, header or subject field, body text, and/or attachments may be hashed. In one embodiment, as part of step 212, the hash result is encrypted using a secret key for example, using a private encryption key of a public/private key pair, though other forms of encryption may be used, including other transformations, such as hashing, with or without a key. The hash result or encrypted hash result is added to the message received in step 210, for example, as a signature block of the message 214. Optionally, the signature block may also include other identifying information such as time, date, recipient e-mail address, or other information, and this information may also optionally be encrypted.

The message described above is built into a conventional e-mail message and the e-mail message is sent 216, and received by a recipient 218. Some or all of the e-mail message including the signature block and, optionally, some or all of the remainder of the e-mail message, is then provided by the recipient to a destination 220, as described below in more detail with reference to FIGS. 3-6. Briefly, in one embodiment, the destination is an e-mail address provided by the sender, in response to a request for the destination, or may be pre-provided within the body of the message or as a reply-to header. The e-mail message may be sent to that destination via e-mail. In another embodiment, the destination is a web site. In this embodiment, the e-mail may optionally contain a verification link which, when clicked, will take the recipient to the web site and automatically transmit the message content to the web site as well. Alternatively, the user may navigate to, and/or log into the web site manually, copy the message content, and paste it into an entry area on the web site.

The destination may be authenticated by the recipient 222. Depending on the type of destination, the recipient may authenticate the destination in different ways, as described in more detail below with reference to FIGS. 3-6. Briefly, in the case of a web site, the user may check that the domain of the web site is familiar and known to be associated with that sender. The body text of the message may include instructions to check the domain for this purpose. Optionally, other methods of authentication, such as use of the customization information described in the related applications, may be used by the recipient to verify the authenticity of the web site. In this embodiment, step 224 may follow step 226 instead of preceding it as shown in the Figure.

Briefly, the use of customization information involves the user and the web site agreeing in advance on certain information that can be provided to the user when the user arrives at the web site or performs a function at the web site that involves a desire for authentication of the web site, such as pasting the message and receiving an indicia of its authenticity as is described herein. An encrypted cookie may be placed on the user's computer system when the customization information is agreed upon to allow the web site to authenticate the user before providing the agreed upon customization information.

In the embodiment where the destination is an e-mail address, the recipient may check that the e-mail address, and/or the domain of the e-mail address, is familiar and known to be associated with that sender, and the body text of the e-mail message may provide instructions for performing this check. In this embodiment, step 222 and 224 may precede step 220, and step 220 is only taken if the destination is determined to be authentic.

If the destination is determined to be inauthentic 224, the method continues at step 234. Otherwise, if the destination is determined to be authentic 224, an attempt is made, for example, by the sender of the message, who may be the party receiving the message at step 220, to authenticate the message content provided to the destination at step 220, as described in more detail below with reference to FIGS. 3-6. Although the sender is described herein as authenticating the message, a trusted agent of the sender may be used instead of, or in conjunction with, the sender, to authenticate the message.

After the server determines whether or not the message content is authentic, indicia of authenticity or lack or authenticity, as appropriate, are provided by the sender or trusted agent to the recipient 228. If it is indicated that the message content is authentic 230, the recipient may elect to believe any information provided in the e-mail and/or take action regarding the e-mail 232. Otherwise, the recipient may elect to disbelieve any information provided, take no action regarding the e-mail, and/or discard the e-mail 234.

FIGS. 3, 4, 5, and 6 are flowcharts illustrating various methods of verifying that a received message is authentic. A message is authentic according to the present invention if it was sent by the purported source or an agent of the purported source, and has not been altered or materially altered since it was sent to the recipient. Steps 314-334, which are included in FIGS. 3, 4, 5, and 6 and are similar or identical in each figure, are described in detail in reference to FIG. 3 below.

As noted above, there are many ways of providing the message, or pertinent parts of the message to a server for authentication. The parts provided include the hash or encrypted hash (e.g. using encryption or by hashing it, with or without a key), as well as the portions of the message that were hashed to produce the hash or encrypted hash. The message or parts of the message may be provided in a manner described by the purported source of the message or its agent. It may be provided by replying or forwarding the message. It may be provided by pasting the message into the server, and it may be provided automatically, in response to the user opening the message, or by clicking on a link, a button or other operator included in, or in conjunction with, the message.

The server to which the message is provided may then attempt to authenticate the message, by rehashing the same parts of the message used to produce the original hash result, and then encrypting the result of the rehashing and comparing it to the encrypted hash result that was part of the message, or by decrypting the encrypted hash result and comparing it to the result of the rehashing. If the encrypted hash results match, or the decrypted hash result matches the result of the rehashing, the message is determined to be authentic, and otherwise the message is not determined to be authentic. The recipient who sent the message to the server is informed of the determination and may act or not act accordingly as described above. It is noted that the encrypting or decrypting functions described herein are optional. For example, if a hash key is used in the transformation that makes up the hash, the hash key may be considered sufficiently secret to not require an encryption.

The server used to authenticate the message may be authenticated by the user, either by checking to see that the address of the server is a trusted address, by receiving the address in a trusted manner, for example by calling a number believed to be that of the purported source of the message, or using the techniques of the related application. FIGS. 3-6 are some examples of combinations of these techniques.

Figure 3:
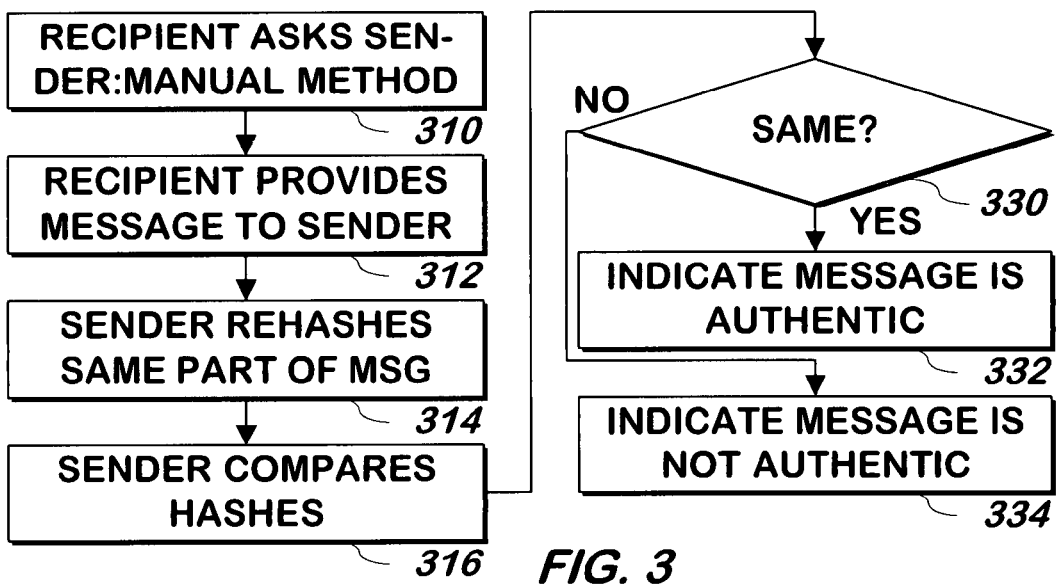
FIG. 3 is a flowchart illustrating a method of authenticating an e-mail message by manually requesting a destination, sending the message to the destination, and receiving a response indicating whether the message is authentic according to one embodiment of the present invention.

FIG. 3 is a flowchart illustrating a manual method of verifying that a received message is authentic according to one embodiment of the present invention.

Recipient Asks Sender (Manual Method)

Referring now to FIG. 3, the sender is queried 310 manually by the recipient, for example by telephone to a trusted number, and in response, the recipient is instructed by the sender to return the message, for example, to a specified email address, for example, by forwarding the message to the specified e-mail address.

Recipient Provides Message to Sender

The sender is provided 312 with the message, or part of the message, along with the encrypted one-way hash result, by the recipient as described above. For example, to provide the sender with the message, or part of the message, along with the encrypted one-way hash result, the recipient may manually send the message to an email address provided by the sender as described above.

Sender Rehashes Same Part of Message

The message, or the same part of the message that was previously hashed, is rehashed 314 by the sender. To rehash the message, or at least the same part of the message that was previously hashed, the sender uses the same hash key and hash technique that was used the first time the message, or part of the message, was hashed. In one embodiment, when the message, or part of the message, is rehashed, the portion of the message which contains the encrypted hash of the message is not encrypted in the re-hash.

Sender Compares Hashes

The result of the rehash of the message is compared 316 to the hash included in the message. To compare the rehash of the message to the hash of the message, the sender either encrypts the result of the rehash using the same technique and key used to encrypt the encrypted hash result in the message and compares the encrypted hash results, or the sender decrypts the encrypted hash result included with the message and compares the decrypted hash result with the result of the rehash.

Indicate Message is Authentic

If the hash results or encrypted hash results are identical 330, it is indicated that the message is authentic 332. To indicate that the message is authentic, the sender may communicate this fact to the recipient, for example by phone, by email or by posting a verification notice on an recipient-accessible location such as a Web site, that the message has been verified.

Indicate Message is Not Authentic

If the hash results or encrypted hash results are not identical 330, it is indicated that the message is not authentic 334. To indicate that the message is not authentic, the sender may communicate to the recipient, using means such as described above, that the message is not authentic: either it was not sent by the sender or was altered after it was sent.

Figure 4:
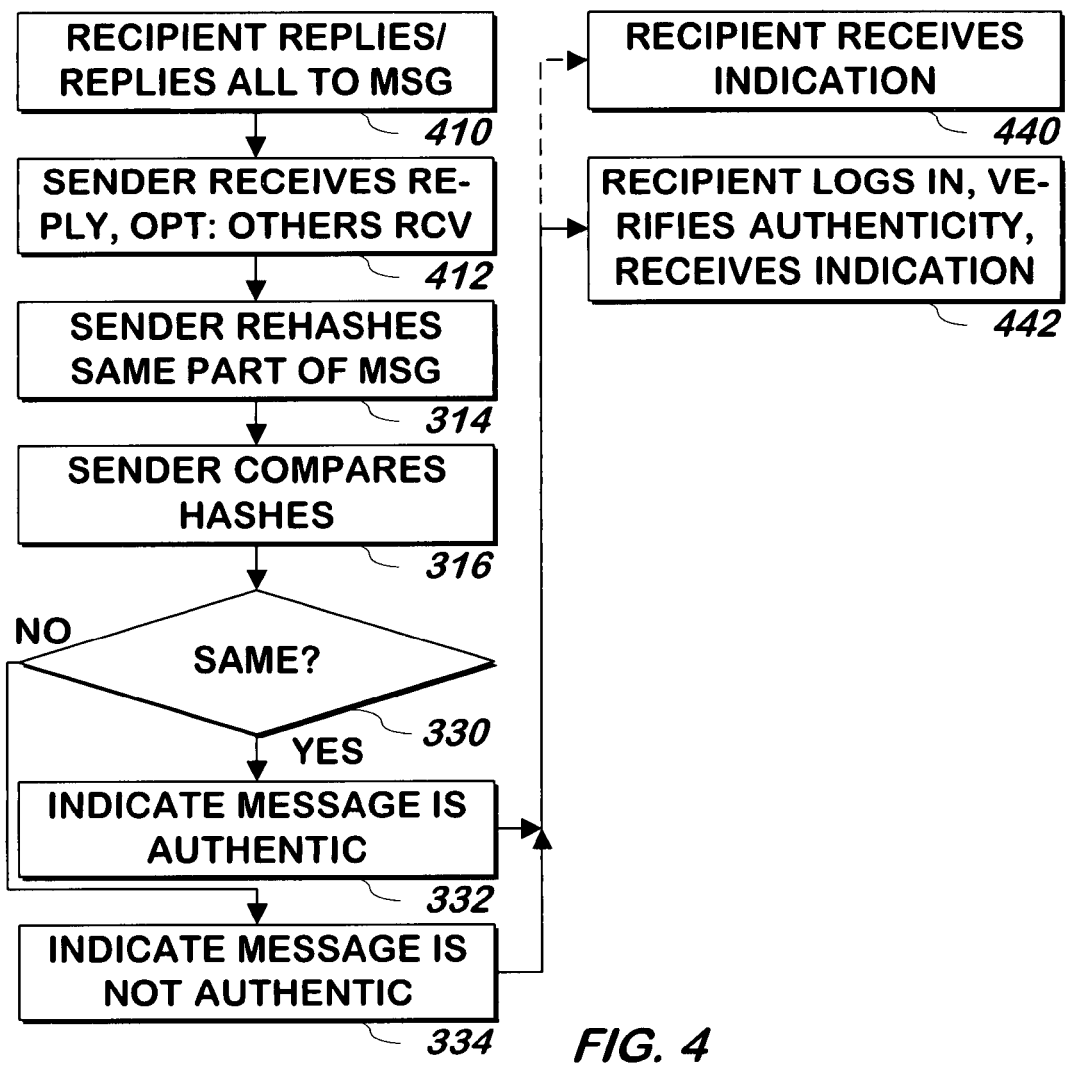
FIG. 4 is a flowchart illustrating a method of authenticating an e-mail message by replying to the sender of the e-mail message or the sender and one or more other recipients of the e-mail message according to one embodiment of the present invention.

As noted above, there are other ways of sending the message to a server for authentication. FIG. 4 is a flowchart illustrating a method of verifying whether a received message is authentic by replying via email according to one embodiment of the present invention.

Recipient Replies/Replies All to Message

Referring now to FIG. 4, the message is replied to by the recipient 410. To reply to the message, the recipient may select the reply, or reply-all, function from within the recipient's email client. In one embodiment, the email address provided by the sender for verification may differ from the actual email address of the sender, and the reply-all function may be chosen by the recipient to provide copies of the message to both the verification email address as well as the email address of the sender. Other recipients of the reply may also be included using reply-all. In these cases, the addressees of the message include such other addresses so that they will receive the message when the reply-all function is used within the recipient's e-mail client.

Sender, and Optionally Others, Receive Reply

The sender, and/or optionally others, receive 412 the recipient's reply, and steps 314-334, described above in reference to FIG. 3, are implemented either by the sender or another party to verify and indicate the authenticity of the message.

Recipient Receives Indication of Authenticity

There are different possible ways of returning the indication of authenticity of the message to the recipient. In one embodiment, the indication of authenticity, or indication of non-authenticity, is received 440 by the recipient. In one embodiment, the indication of authenticity, or indication of non-authenticity, is received by the recipient in a manner similar to those described in FIG. 3.

Recipient Logs In, Verifies Authenticity, Receives Indication of Authenticity

In another embodiment, the indication of authenticity, or indication of non-authenticity, is received 442 by the recipient after the recipient logs in to the sender's Web site and optionally first verifies the authenticity of the sender's Web site for example, by verifying the receipt of shared, secret customization information previously agreed upon, as described in the related applications. For example, before, after or as part of logging in to the sender's Web site, the authenticity of the Web site may be verified by the recipient verifying the receipt from the server of a secret image previously agreed upon by the recipient and the sender, and then the recipient may be presented with the indication of authenticity of steps 332 or 334 and optionally with a copy of the verified message. The indicia of authenticity or non-authenticity may be provided after the user supplies a password, which may be prompted with or after the customization information is displayed.

Figure 5:
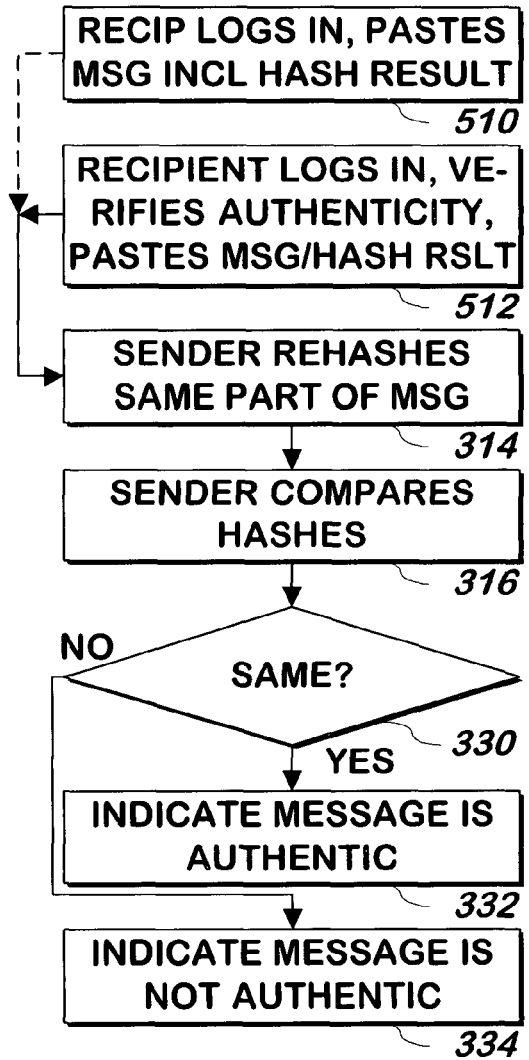
FIG. 5 is a flowchart illustrating a method of authenticating an e-mail message by pasting some or all of the message into a web site according to one embodiment of the present invention.

There are still other ways of providing the message or pertinent parts of the message to a server. FIG. 5 is a flowchart illustrating a method of verifying the authenticity of a message by the user manually copying and pasting the message into a message verifier according to one embodiment of the present invention.

Recipient Logs In, Pastes Message and Hash Result

Referring now to FIG. 5, some or all of the message, including the encrypted hash result received with the message, are copied and pasted into the sender's Web site after a log in process has been completed 510. To copy and paste the message and encrypted one-way hash result into the sender's Web site after a log in process has been completed, the recipient may use the Select All function followed by the Copy function within the recipient's email client. The recipient may then log in and use the Paste function within one or more pages of the sender's Web site to paste some or all of the message and the encrypted hash result to the server. In another embodiment, only the portion of the message used to produce the encrypted hash result, as well as the encrypted hash result, is copied and pasted. Such portion may be identified in the message, for example, by being in a different color or section of the message. Instructions at the web site describe to the user how to copy the correct portion.

Recipient Logs In, Verifies Authenticity, Pastes Message/Hash Result

In another embodiment, at step 512, prior to copying, logging in, and pasting the message and encrypted hash result of the message into the sender's Web site as described above in step 510, the authenticity of the sender's Web site may first be verified by the recipient in a manner at least similar to step 442.

Steps 314-334, described above in reference to FIG. 3, are implemented to verify and indicate the authenticity of the message.

Figure 6:
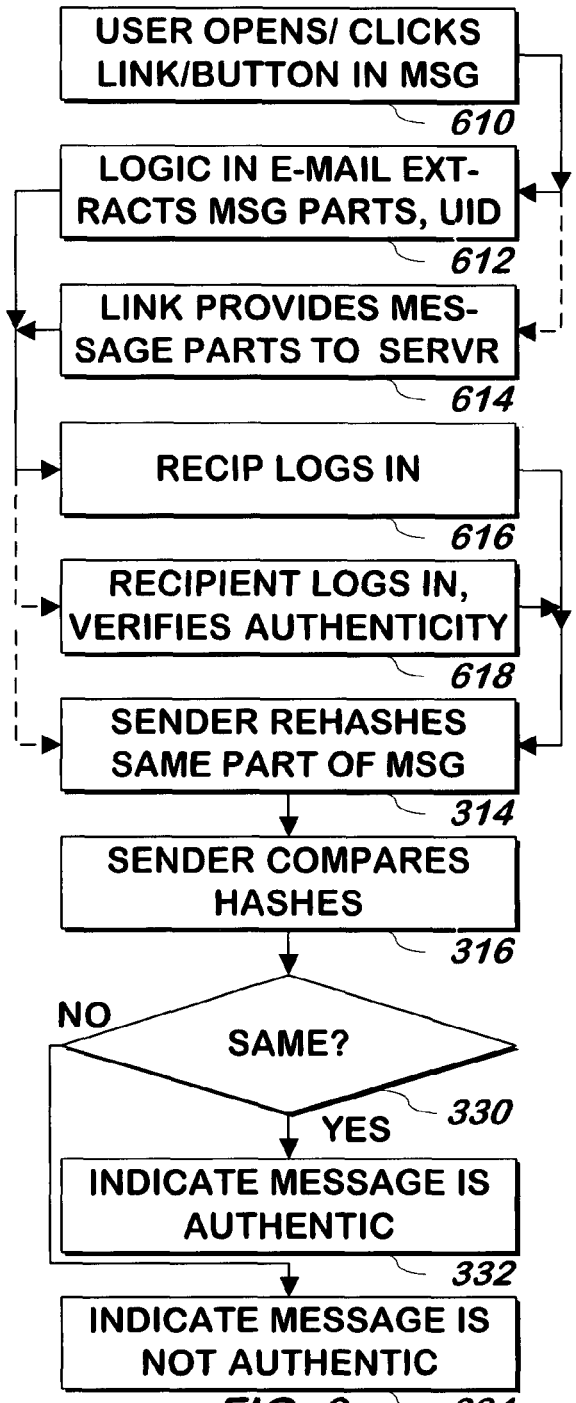
FIG. 6 is a flowchart illustrating a method of authenticating an e-mail message automatically, or by clicking a button or a link on the e-mail message according to one embodiment of the present invention.

Another way of providing the pertinent portions of the message may be via the user opening the message or by the user clicking on a button or a link in the message itself. FIG. 6 illustrates a method of verifying the authenticity of a message by clicking a verification link according to one embodiment of the present invention.

User Clicks Link in Message

Referring now to FIG. 6, the message is opened, and optionally, a verification button or link in the message is clicked 610 by the user. In one embodiment, code that runs upon opening the message, or upon clicking a verification button or link included in the message by the sender may direct the recipient to the sender's Web site, and the code corresponding to the message, when opened, or the button or link, when clicked, may also automatically transmit the received message or the pertinent portions of the message to the sender's Web site, as described below.

Logic in E-Mail Extracts Message Parts and User ID

In one embodiment, for example in an HTML email, logic may be built into the message so that when the message is opened, or into a button so that when clicked, the e-mail message or parts thereof, including the encrypted hash result, are extracted from the email and automatically posted back to the server 612. The logic may include a conventional submit button or code such as Java or JavaScript code or a Flash Movie that runs automatically upon the message being opened, or in response to a link or button being clicked. The logic also brings the recipient's browser to a log in web page for use as described below.

Link Contains Message Parts

In another embodiment, for example in a plain text email, a compressed version of the message contents, including the encrypted hash result may be included as part of a link, and the message contents or pertinent parts thereof may be automatically returned to the server in this manner 614 when the user clicks the link. The clicking of the link also directs the recipient's browser to a log in page for use as described below.

Recipient Logs In

Following step 612 or step 614, a log in process may be completed by the recipient 616, and steps 314-334, described above in reference to FIG. 3, are implemented to verify and indicate the authenticity of the message.

Recipient Logs In, Verifies Authenticity

In another embodiment following step 612 or step 614, the log in process may be completed by the recipient, the authenticity of the sender's Web site may be verified during the log in process in a manner at least similar to step 442, and steps 314-334, described above in reference to FIG. 3, are implemented to verify and indicate the authenticity of the message.

Message is Verified

In yet another embodiment following step 612 or step 614, a log in process may not be completed by the recipient, and steps 314-334, described above in reference to FIG. 3, are implemented to verify and indicate the authenticity of the message. In this embodiment, the user does not log into the server, but merely authenticates the message, receiving an indicia of authenticity via e-mail, text message, voice or otherwise as described herein.

System

Figure 7:
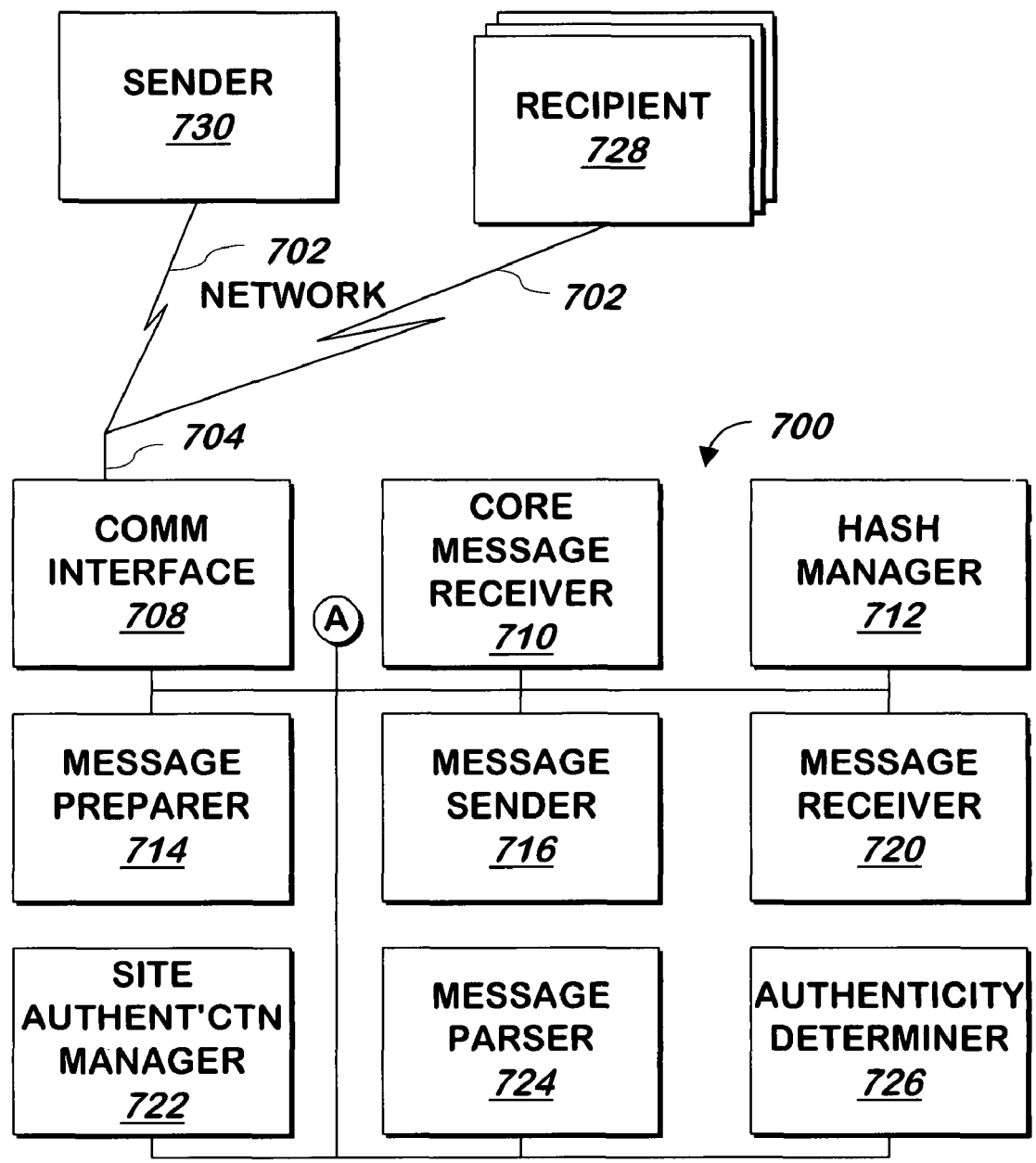
FIGS. 7 and 8 are a block schematic diagram of a system for authenticating an e-mail message according to one embodiment of the present invention.
Figure 8:
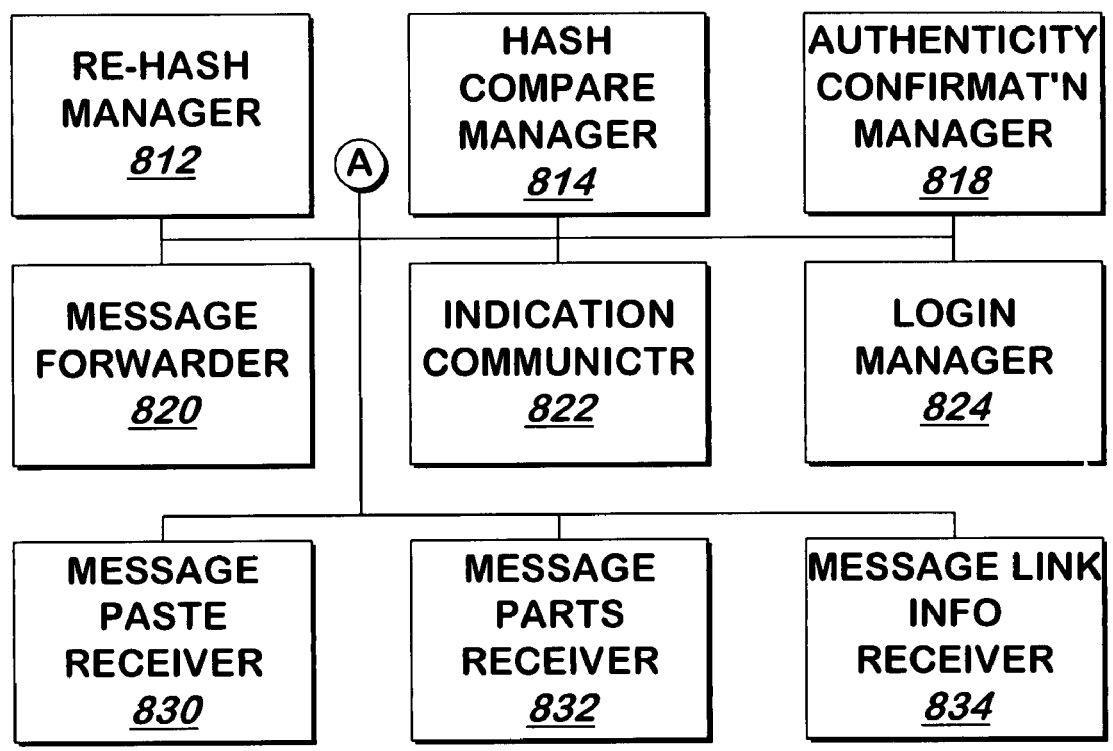

FIGS. 7 and 8 illustrate a block schematic diagram illustrating a system for authenticating the originator and verifying the contents of an electronic message according to one embodiment of the present invention, and also include a message sender system and several recipient systems for use with such system as described herein. Referring now to FIG. 7, a message sender 730, including a conventional computer system, sends messages to each of several recipients, such as recipient 728, which each may include a conventional computer system, via system 700. In one embodiment, all communication into or out of system 700 is made via input/output 704 of communication interface 708 which is coupled to network 702. Network 702 is a network such as the Internet or a local area network or both. Communication interface 708 is a conventional communication interface that supports TCP/IP, Ethernet, or other conventional communication protocols.

At any time, core message receiver 710 may receive message fields from sender 730, via communication interface 708. The message fields include one or more recipient addresses, a sender address, and a message body. The message fields may also include additional optional information, such as a reply-to address or signature block information such as time, date, recipient e-mail address, or other information. When core message receiver 710 receives the message fields, it provides the message fields to hash manager 712.

When hash manager 712 receives message fields from core message receiver 710, hash manager 712 hashes at least one of the message fields using a one-way mathematical compression function such as SHA, and encrypts the result using a secret encryption key. Any transformation may be used as a hash. In one embodiment, the secret key, if used in the hash, is provided by a system administrator and locally stored. In one embodiment, hash manager 712 encrypts the result using DES, triple DES or other conventional encryption techniques. In one embodiment, the at least one field hash manager 712 hashes includes some or all of the message body, which may include a date and time and may include other portions that are conventionally associated with a signature block. Hash manager 712 may hash any or all of the message fields in other embodiments. Optionally, hash manager 712 also encrypts any signature block information received as part of the message fields. When hash manager 712 has hashed the message field or fields, encrypted the hash result, and optionally encrypted any signature block information, hash manager 712 provides the message fields, optionally including the encrypted signature block information, and the encrypted hash result to message preparer 714.

When message preparer 714 receives the message fields and an encrypted hash result from hash manager 712, message preparer 714 builds an e-mail message using the message fields, and in one embodiment includes the encrypted hash result and any signature block information, which may or may not be encrypted, at the end of the message. The encrypted hash result and any signature block information may be placed in other locations in other embodiments. When message preparer 714 has built the e-mail message, message preparer 714 provides the e-mail message to message sender 716.

When message sender 716 receives an e-mail message from message preparer 714, message sender 716 sends the e-mail to each recipient 728 addressed in the e-mail headers. In FIG. 7 three recipients are shown as a representative example, but any number of recipients may exist. In the described embodiment, several recipients receive the same e-mail message, though in other embodiments, each recipient may receive a different e-mail message, or any combination of same and different e-mail messages may be used.

As previously described, when recipient 728 receives an e-mail, recipient 728 may choose to authenticate the e-mail by providing some or all of the message contents, including the signature block, for authentication. As previously described, in one embodiment, recipient 728 provides the message contents through e-mail, and in another embodiment recipient 728 provides the message content through a web site. In the embodiment that recipient 728 provides the message content through a web site, recipient 728 is optionally offered a chance to authenticate the web site using customization information, previously agreed upon by the parties, described in more detail in a related application.

Briefly, when a user registers for customization information, site authentication manager 722 prompts the user via communication interface 708 to choose one picture from a number of pictures, though information other than pictures can be used, and pictures can be submitted rather than being selected. Site authentication manager 722 stores this picture and/or associates it with a user ID received from or assigned to the user. Site authentication manager 722 also stores an encrypted cookie indicating the user's identity in the user's browser, and thereafter, whenever the user visits an associated web site, the user's browser provides that cookie to site authentication manager 722. Site authentication manager 722 prompts the user for a login ID and, if the login ID matches the identity stored in the cookie, presents with the picture or other information he or she chose or provided earlier, before prompting him or her for a password. This optional step allows the user to confirm that the site he or she is now visiting is the same site (or one associated therewith) with which he or she established the relationship corresponding to the customization information, and not a fraudulent impostor.

In the embodiment where recipient 728 provides the message content through e-mail, message receiver 720 receives it via communications interface 708. In the embodiment where recipient 728 provides the message and hash content through a web site, a web application managing the site provides the message content to message receiver 720 via communications interface 708.

When message receiver 720 receives message content from recipient 728 as described above, message receiver 720 provides the content to message parser 724.

When message parser 724 receives message content, message parser 724 parses the message to retrieve the signature block, and decrypts any encrypted content. In order to decrypt the encrypted content, message parser 724 uses the same secret key provided to hash manager 712. In one embodiment, the secret key is provided by a system administrator and locally stored by message parser 724. When message parser 724 has decrypted the signature block, message parser 724 parses the signature block to retrieve the hash result. Message parser 724 provides the decrypted hash result along with any additional message content to authenticity determiner 726.

When authenticity determiner 726 receives a hash result and any additional message content, authenticity determiner 728 determines whether or not the message content is authentic, as described in more detail below with reference to FIG. 8.

When authenticity determiner 726 determines whether or not the message content is authentic, authenticity determiner 726 provides indicia of authenticity or lack of authenticity, as appropriate, to recipient 728, as described herein, and above with reference to FIG. 8. If authenticity determiner 726 provides indicia of authenticity, recipient 728 may elect to believe any information provided in the e-mail and/or take action regarding the e-mail. Otherwise, if authenticity determiner 726 provides indicia of lack of authenticity, recipient 728 may elect to disbelieve any information provided, take no action regarding the e-mail, and/or discard the e-mail 234. Such action may include responding to the e-mail by logging into an account.

Manual Method

In one embodiment, recipient 728 queries sender 730 manually, as described above, and receives instructions on how to return the email, as described above.

When recipient 728 receives instructions on how to return the email, recipient 728 provides the email to message receiver 720 using the instructions received. Such return may include e-mail forwarding the e-mail message to an address specified in the instructions.

When message receiver 720 receives the email, message receiver 720, sends the email to message parser 724. In one embodiment, message receiver 720 sends the entire email including all message content, as well as the encrypted one-way hash of the message, to message parser 724.

When message parser 724 receives the email, message parser 724 parses the email, extracts the original message content and the encrypted one-way hash of the message, and decrypts the encrypted one-way hash of the message. When message parser 724 has parsed the email and decrypted the extracted one-way hash of the message, message parser 724 sends the message content and the decrypted one-way hash of the message to re-hash manager 812.

When re-hash manager 812 receives the message content and the decrypted one-way hash of the message, re-hash manager 812 hashes the received message content using the same hash key used to produce the first one-way hash of the message content. When re-hash manager 812 has finished hashing the message, re-hash manager 812 sends both the received decrypted one-way hash and the newly produced one-way hash to hash compare manager 814.

When hash compare manager 814 receives the two one-way hashes, hash compare manager 814 compares the two one-way hashes to determine if they are identical.

If hash compare manager 814 determines that the two one-way hashes are identical, hash compare manager 814 signals authenticity confirmation manager 818 that the message is authentic.

If hash compare manager 814 determines that the two one-way hashes are not identical, hash compare manager 814 signals authenticity confirmation manager 818 that the message is not authentic.

Specific details of the various methods of providing the message are described below.

Reply/Reply All

If the reply/reply all option is used to verify the authenticity of a message, recipient 728 replies/replies all to the received message. In one embodiment, recipient 728 may reply only to the original sender, or recipient 728 may reply all to many entities, including the original sender and/or another verification email address, as described above. When recipient 728 replies/replies all to the message, message forwarder 820 receives the reply.

When message forwarder 820 receives the reply, message forwarder 820 sends the email to message parser 724, and optionally as well as to any additional email addresses that may or may not have been included by the recipient, as described above.

Message parser 724, re-hash manager 812 and hash compare manager 814 perform their respective tasks as described above, as well as other portions of system 700 (which includes all of FIG. 8). In one embodiment, in addition to sending the message content and decrypted one-way hash to re-hash manager 812, message parser 724 also extracts recipient's 728 email address, which is passed to authenticity confirmation manager 818 to be stored with the indicia of authenticity associated with the user ID corresponding to recipient's 728 email address.

When authenticity confirmation manager 818 receives from hash compare manager 814 as described above the information indicating whether a message is authentic or non-authentic, and optionally the email address of recipient 728, authenticity confirmation manager 818 provides such information to indication communicator 822, or authenticity confirmation manager 818 provides such information to log in manager 824.

When indication communicator 822 receives the information from authenticity confirmation manager 818, indication communicator 822 communicates the authenticity or non-authenticity of the message content to recipient 728. In one embodiment, indication communicator 822 may utilize any conventional means of communication, such as email or a voice synthesizer and a telephone, to communicate the authenticity or non-authenticity of the message to recipient 728.

When log in manager 824 receives a signal from authenticity confirmation manager 818, log in manager operates as described above, and when the user logs in, log in manager 824 looks up the user's e-mail address that may have been provided to log in manager via a registration process at an earlier time, or by a system administrator, and is associated with the user's user identifier that the user provides when the user logs in. Log in manager 824 then provides the indication as to whether the e-mail message was authentic. In one embodiment, to accommodate multiple messages, log in manager stores the date and time that the authentication indicia was received and provides such date and time with each indicia to allow the user to distinguish among them. In one embodiment, log in manager receives and provides some or all of the message with the indicia, the message being received from authenticity confirmation manager 818 via message parser 724 to allow the indicia to be matched to the message from the user.

Copy/Paste

If the copy/paste method is used by the recipient 728 to verify the authenticity of the message, the message is copied and pasted into the sender's Web site, as described above. In one embodiment, recipient 728 may first verify the authenticity of the Web site using a system of secrets, as described above, with log in manager 824. When recipient has copied and pasted the message into the sender's Web site, message paste receiver 830 receives the message.

When message paste receiver 830 receives the email, including the message content as well as the encrypted one-way hash of the message, message paste receiver 830 sends the email to message parser 724.

Message parser 724, re-hash manager 812 and hash compare manager 814 perform their respective tasks as described above.

Click

If the click or automatic method is used by recipient 728 to verify the authenticity of a message, when the message is opened or when a link or button embedded in the email is clicked by recipient 728 as described above, logic embedded with the e-mail or otherwise associated therewith (e.g. because the e-mail message includes a reference to a web address that contains such logic), is executed by the browser or e-mail client in the recipient system 728. If the message is opened, or a link clicked by recipient 728 is a button or an HTML link that posts or otherwise causes a program to extract the separate message parts of the email and the user ID, as described above, the message parts and user ID are received by message parts receiver 832.

When message parts receiver 832 receives the extracted message content and encrypted one-way hash of the message, as well as the user ID associated with the email address of recipient 728, message parts receiver 832 signals log in manager 824 with the message parts, or sends the message directly to message parser 724, as described above.

If the link clicked by recipient 728 is a link containing a compressed version of the message contents, as described above, the compressed version of the message contents are received by message link information receiver 834.

When message link information receiver 834 receives a compressed version of the message contents, message link information receiver 834 decompresses the message contents, and sends the decompressed message and decompressed, decrypted one-way hash of the message to log in manager 824 or directly to message parser 724, as described above.

Log in manager 824, message parser 724, re-hash manager 812 and hash compare manager 814 perform their respective tasks as described above, allowing the user to optionally log in and verify the authenticity of the web site, and then see the indicia of authenticity.

It isn't necessary to encrypt the hash result in the message. In such embodiment, the hash result is not decrypted for comparison to the rehash, or the rehash is not encrypted.

As used herein, the sender is the sender of the original e-mail message and the recipient is the recipient of the original e-mail message. The sender may include any number of agents of the sender: it is not necessary that the sender perform all of the functions described as being performed by the sender. Sender 730 and recipient 728 may include a conventional computer system, and recipient 728 may include a conventional browser and e-mail client.

What is claimed is:

1. A method of providing and authenticating an e-mail message, comprising:
   providing a first portion of the e-mail message from a sender;
   transforming the first portion of the e-mail message to produce a second portion of the e-mail message;
   sending the first portion and the second portion of the e-mail message from the sender to a recipient;
   receiving the first portion of the e-mail message and second portion of the e-mail message from the recipient;
   transforming the first portion of the e-mail message received to produce a second transformation of the e-mail message;
   comparing the second transformation of the e-mail message with the second portion of the e-mail message received; and
   providing to the recipient an indication of authenticity of the e-mail message responsive to the comparing step;
   wherein the receiving step comprises the step of providing a web site through which the recipient provides the first portion of the e-mail message and the second portion of the e-mail message;
   wherein the indication of authenticity of the e-mail message is provided to the recipient through the web site; and
   wherein the steps are performed at least part by one or more computer systems.

2. The method of claim 1, wherein the transforming steps each comprise hashing.

3. The method of claim 2, wherein the transforming the first portion of the e-mail message to produce a second portion of the e-mail message step additionally comprises encrypting said first portion of the e-mail message.

4. The method of claim 1, wherein at least one of the first portion of the e-mail message and the second portion of the e-mail message are received via e-mail.

5. The method of claim 1, wherein at least one of the first portion of the e-mail message and the second portion of the e-mail message are received via a paste operation.

6. The method of claim 1, wherein at least one of the first portion of the e-mail message and the second portion of the e-mail message are received via an operator sent as part of the e-mail message.

7. The method of claim 6, wherein the operator comprises a submit button.

8. The method of claim 6, wherein the operator comprises a program.

9. The method of claim 6, wherein the operator comprises a link.

10. The method of claim 1, additionally comprising providing information previously agreed upon by the recipient and a party at least related to a party sending the first portion and the second portion of the e-mail message to the recipient.

11. A method of authenticating an e-mail message, comprising:
   receiving the message by a recipient, the message comprising a first portion of the message and a second portion comprising a transformation of the first portion;
   providing the first portion and the second portion of the message from the recipient to an authenticating party through a web site provided by the authenticating party;
   receiving an indication from the authenticating party at the recipient indicating whether the message is authentic or not authentic;
   responsive to the indication indicating the message is authentic, the recipient taking a first type of action; and
   responsive to the indication indicating the message is authentic, the recipient taking a second type of action, different from the first type of action;
   wherein the indication of authenticity of the e-mail message is provided to the recipient through the web site.

12. A system for providing and authenticating an email message, comprising:
   a core message receiver having an input for receiving a first portion of the e-mail message, the core message receiver for providing at an output the first portion of the e-mail message;
   a hasher having an input coupled to the core message receiver for receiving the first portion of the e-mail message, the hasher for transforming the first portion of the e-mail message to produce a second portion of the e-mail message and for providing at an output the second portion of the e-mail message;
   a message sender having a first input coupled to the core message receiver output for receiving the first portion of the e-mail message and a second input coupled to the message hasher output for receiving the second portion of the e-mail message, the message sender for sending the first portion and the second portion of the e-mail message to a recipient;
   a message receiver having an input for receiving the first portion of the e-mail message and second portion of the e-mail message from the recipient, the message receiver for providing the first portion of the e-mail message and the second portion of the e-mail message at an output;
   a rehash manager having an input coupled to the message receiver output for receiving the first portion of the e-mail message, the rehash manager for transforming the first portion of the e-mail message to produce a second transformation of the e-mail message and for providing the second transformation of the e-mail message at an output;
   a hash compare manager having a first input coupled to the message receiver output for receiving the second portion of the message, and a second input coupled to the rehash manager output for receiving the second transformation, the hash compare manager for comparing the second transformation of the e-mail message with the second portion of the e-mail message received and for providing at an output an indication of authenticity of the e-mail message responsive to said comparing; and
   an indication communicator having an input coupled to the hash compare manager output, and the indication communicator for providing the indication to the recipient
   wherein the input of the message receiver comprises a web site through which the recipient provides the first portion of the e-mail message and the second portion of the e-mail message; and
   wherein the indication of authenticity of the e-mail message is provided to the recipient through the web site.

13. The system of claim 12, wherein the transforming by the hasher and the transforming by the rehash manager each comprise hashing.

14. The system of claim 13, wherein the transforming by the hasher additionally comprises encrypting said first portion of the e-mail message.

15. The system of claim 12, wherein at least one of the first portion of the e-mail message and the second portion of the e-mail message are received by the message receiver via e-mail.

16. The system of claim 12, wherein at least one of the first portion of the e-mail message and the second portion of the e-mail message are received by the message receiver via a paste operation.

17. The system of claim 12, wherein at least one of the first portion of the e-mail message and the second portion of the e-mail message are received by the message receiver via an operator sent as part of the e-mail message.

18. The system of claim 17, wherein the operator comprises a submit button.

19. The system of claim 17, wherein the operator comprises a program.

20. The system of claim 17, wherein the operator comprises a link.

21. The system of claim 12 additionally comprising a log in manager for providing information previously agreed upon by the recipient and a party at least related to a party sending the first portion and the second portion of the e-mail message to the recipient.

22. A computer program product comprising a non-transitory computer useable medium having computer readable program code embodied therein for providing and authenticating an e-mail message, the computer program product comprising computer readable program code devices configured to cause a computer system to:
   provide a first portion of the e-mail message from a sender;
   transform the first portion of the e-mail message to produce a second portion of the e-mail message;
   send the first portion and the second portion of the e-mail message from the sender to a recipient;
   receive the first portion of the e-mail message and second portion of the e-mail message from the recipient;
   transform the first portion of the e-mail message received to produce a second transformation of the e-mail message;
   compare the second transformation of the e-mail message with the second portion of the e-mail message received; and
   provide to the recipient an indication of authenticity of the e-mail message responsive to the comparing step;
   wherein the receiving comprises providing a web site through which the recipient provides the first portion of the e-mail message and the second portion of the e-mail message; and
   wherein the indication of authenticity of the e-mail message is provided to the recipient through the web site.

23. The computer program product of claim 22, wherein the computer readable program code devices configured to cause the computer system to transform each comprise computer readable program code devices configured to cause the computer system to hash.

24. The computer program product of claim 23, wherein the computer readable program code devices configured to cause the computer system to transform the first portion of the e-mail message to produce a second portion of the e-mail message additionally comprises computer readable program code devices configured to cause the computer system to encrypt said first portion of the e-mail message.

25. The computer program product of claim 22, wherein at least one of the first portion of the e-mail message and the second portion of the e-mail message are received via e-mail.

26. The computer program product of claim 22, wherein at least one of the first portion of the e-mail message and the second portion of the e-mail message are received via a paste operation.

27. The computer program product of claim 22, wherein at least one of the first portion of the e-mail message and the second portion of the e-mail message are received via an operator sent as part of the e-mail message.

28. The computer program product of claim 27, wherein the operator comprises a submit button.

29. The computer program product of claim 27, wherein the operator comprises a program.

30. The computer program product of claim 27, wherein the operator comprises a link.

31. The computer program product of claim 22 additionally comprising computer readable program code devices configured to cause the computer system to provide information previously agreed upon by the recipient and a party at least related to a party sending the first portion and the second portion of the e-mail message to the recipient.

* * * * *